United States Patent [19]

Wilson

[11] Patent Number: 4,467,603
[45] Date of Patent: Aug. 28, 1984

[54] TORQUE TRANSFER APPARATUS

[76] Inventor: William L. Wilson, 14461 S.R. 104, Ashville, Ohio 43103

[21] Appl. No.: 281,483

[22] Filed: Jul. 8, 1981

[51] Int. Cl.³ ............................................. F16D 31/02
[52] U.S. Cl. ........................................ 60/369; 60/484; 60/486
[58] Field of Search ............... 60/325, 402, 419, 428, 60/369, 375, 423, 431, 484, 486

[56] References Cited

U.S. PATENT DOCUMENTS 1,640,616  8/1927  Reese ..................................... 60/325

Primary Examiner—Robert E. Garrett
Assistant Examiner—John M. Hosar
Attorney, Agent, or Firm—Harvey B. Jacobson

[57] ABSTRACT

A torque transfer apparatus includes one or more externally powered energy pumps having a plurality of piston and follower arrangements. The pistons are attached to crankshafts, while the associated followers are controlled by a timing chain driven camshaft. The energy pumps are provided with belt drives to power one or more oil pumps, and the oil pumps provide pressurized oil between the followers and pistons so as to improve power transfer efficiency. Additionally, return lines are provided which permit the pressurized oil to be returned to the oil pump during a return stroke of the associated pistons.

8 Claims, 3 Drawing Figures

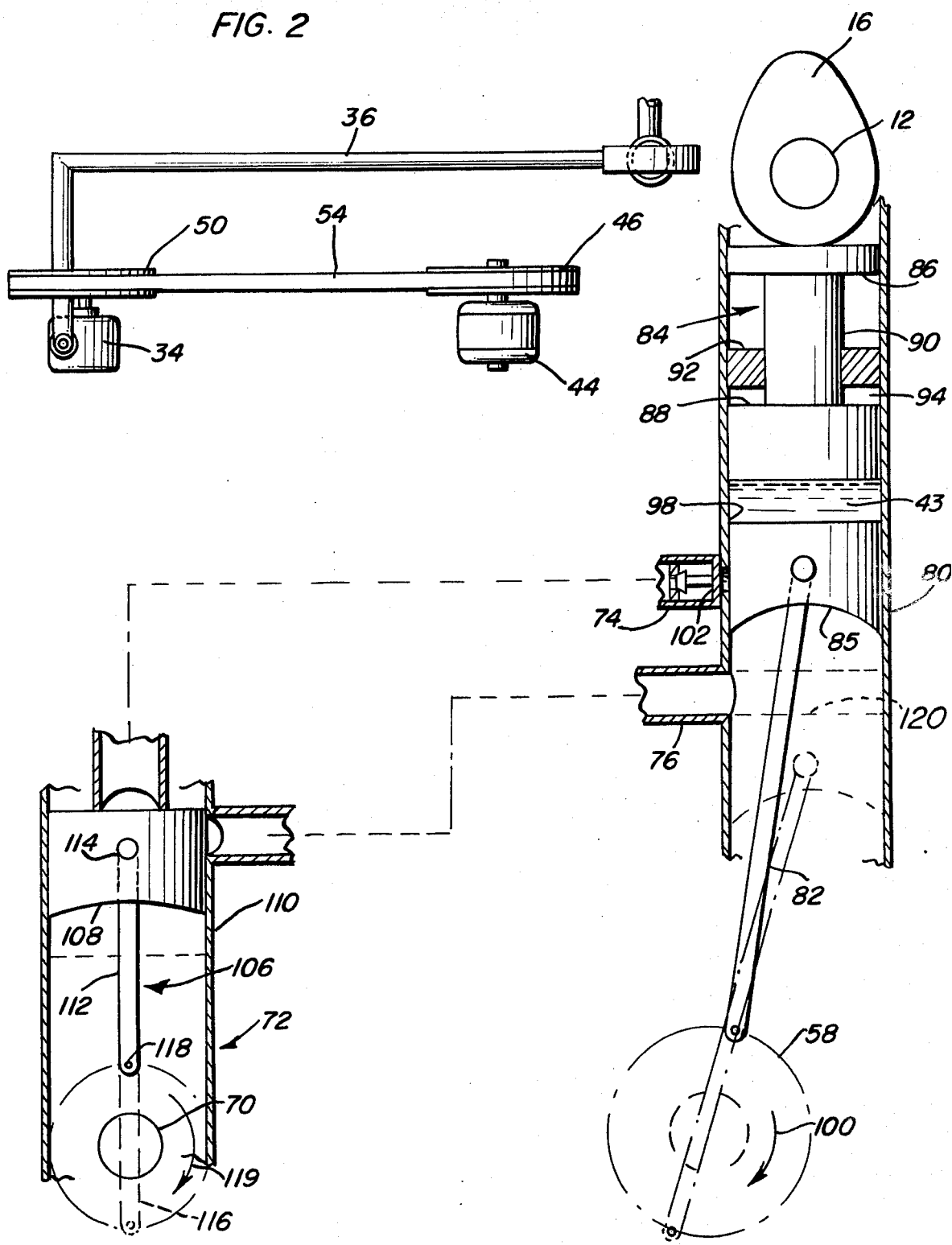

TORQUE TRANSFER APPARATUS

BACKGROUND OF THE INVENTION

1. Field of the Invention

The present invention relates generally to power transfer mechanisms and more particularly pertains to a new and improved power transfer apparatus that utilizes both mechanical and hydraulic means to effect maximum power transfer efficiency.

2. Description of the Prior Art

Power transfer devices are effectively defined as being any type of machine which will receive a source of power at an input and transfer that power to an output where, if desired, it can be utilized to accomplish work. Of course, such devices may come in many shapes and forms and in this connection, they may be mechanical, chemical or electrical in nature. Additionally, electrical, chemical and mechanical constructions may be combined to create more efficient or specific purpose apparatuses to effect such power transfers. As such, it can be appreciated that there exists a continuing need for improved power transfer devices which efficiently combine existing power transfer machines to effect a desired operation. In this respect, the present invention substantially fulfils such a need.

SUMMARY OF THE INVENTION

The general purpose of the present invention, which will be subsequently described in greater detail, is to provide an improved power transfer device that has all of the advantages of the prior art power transfer devices and none of the disadvantages. To attain this, the present invention utilizes one or more externally powered energy pumps having a plurality of pistons operably connected to crankshafts, such pistons cooperating with a timing chain driven camshaft to effect a reciprocal movement of a plurality of associated free-floating cam follows. Further, the energy pumps in turn are provided with belt drives which operate one or more oil pumps so as to provide pressurized oil between the cam followers and the piston heads. The pressurized oil serves to increase the efficiency of the power output of the apparatus, and return lines may be provided from the respective piston cylinders so as to permit a return of pressurized oil to an oil pump during return strokes of the respective pistons. Power outputs may be provided by output shafts connected to the one or more energy pumps associated with the system.

It is therefore an object of the present invention to provide an improved power transfer apparatus that has all the advantages of similarly employed prior art power transfer apparatuses and none of the disadvantages.

It is another object of the present invention to provide an improved power transfer apparatus that may be easily and economically manufactured.

It is a further object of the present invention to provide an improved power transfer apparatus which is both simple in construction and limited in the number of moving parts.

Still another object of the present invention is to provide an improved power transfer apparatus that is efficient and reliable in its operation.

Yet another object of the present invention is to provide an improved power transfer apparatus which combines the features of both hydraulic and mechanical power transfer systems.

Even another object of the present invention is to provide an improved power transfer apparatus that may be utilized to amplify torque applied thereto.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a top plan view of a portion of the present invention illustrating the manner of connection between an oil pump and an energy pump associated therewith.

FIG. 3 is a detailed view, partly in cross section, illustrating the structural and operational configuration of a portion of the present invention.

DESCRIPTION OF THE PREFERRED EMBODIMENT

Figure 1:
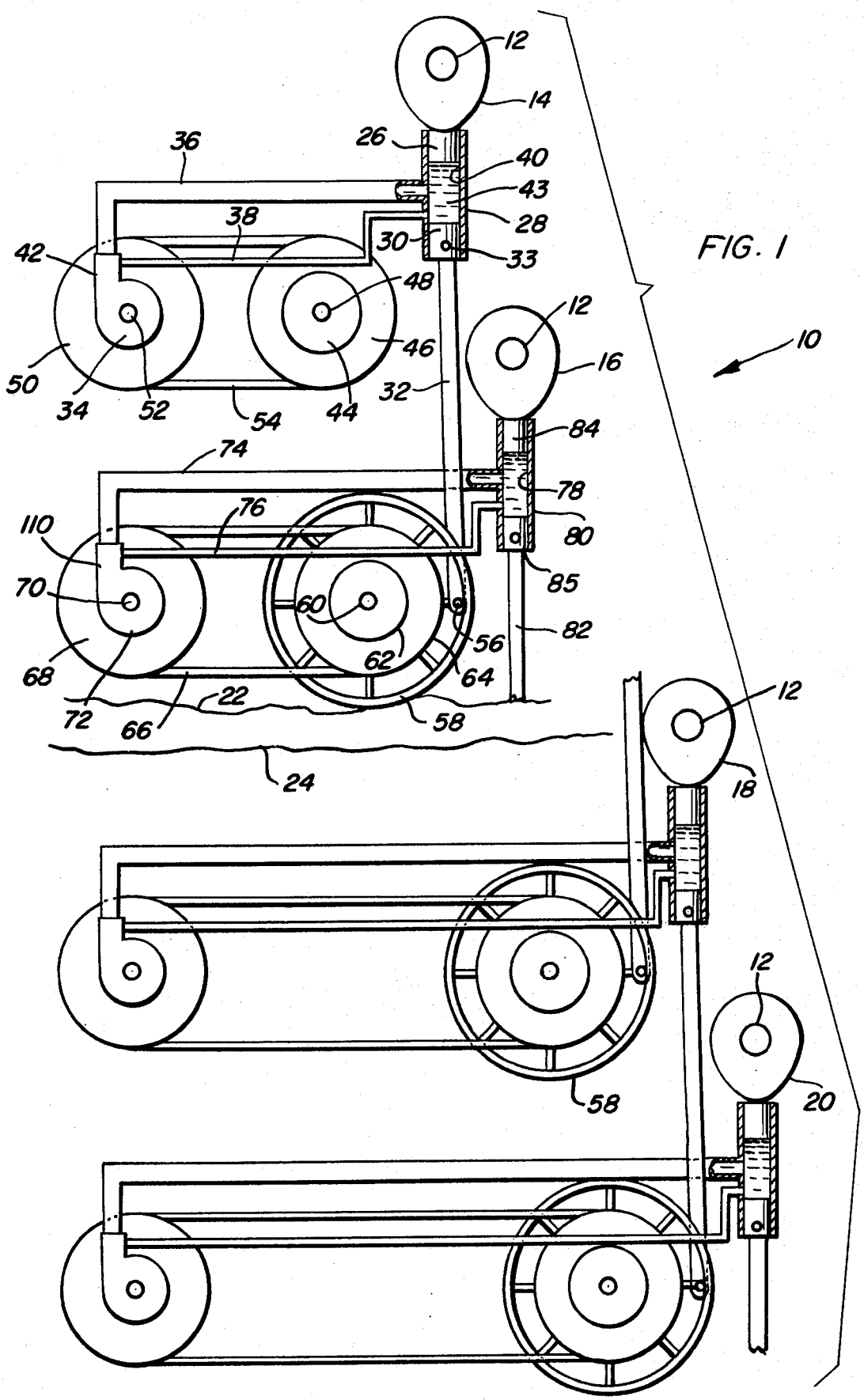
FIG. 1 is a schematic illustration of the power transfer apparatus forming the present invention.

With reference now to the drawings and in particular to FIGS. 1 and 2, an improved power transfer apparatus embodying the principles and concepts of the present invention and generally designated by the reference numeral 10 will be described. In this respect, it can be seen that the power transfer apparatus 10 may include a rotatable camshaft 12 supplied with rotative power by an unillustrated conventional power source, such as a timing chain, with the chamshaft being shown schematically illustrated in four different locations within FIG. 1 and being further illustrated as having a plurality of cams 14, 16, 18, 20 fixedly secured thereto. As such, it can be appreciated that the cams 14, 16, 18, 20 may be of any number and may be so positioned on the camshaft 12 as to effect the desired timing of operation of a machine associated therewith. In this regard, the separation lines 22, 24 serve to illustrate the fact that any such number of cams 14, 16, 18, 20 could be employed on the camshaft 12.

With particular reference to cam 14 positioned on camshaft 12, it can be seen that the same is normally in a sliding abutting relationship with a cam follower 26, such cam follower being in turn slidably positioned within a cylinder 28. Accordingly, a rotation of the cam 14 concurrently with the camshaft 12 results in a reciprocal movement of the cam follower 26 within the cylinder 28 in a conventional and well known manner. At an opposed end of the cylinder 28, it can be seen that a power piston 30 may be reciprocably positioned therein, such piston being pivotally attached to a piston rod 32 by means of a piston rod 33 interconnected between the piston and the piston rod in a conventional manner.

Additionally illustrated in FIG. 1 is the use of an oil pump 34 having an oil discharge line 36 and an oil return line 38. In this regard, the oil discharge line 36 and the oil return line 38 are both in fluid communication with an interior portion 40 of the cylinder 28. Additionally, the oil discharge line 36 and oil return line 38 are both in fluid communication with a neck portion 42 of the oil pump 34. As shown in FIG. 1, the interior portion 40 of the cylinder 28 is maintained in a filled condition with oil 43 deliverable thereto by the oil pump 34. As will be described subsequently with reference to the further views of the drawings, the oil discharge line 36 and oil return line 38 cooperatively operate to permit a change in volume of the oil 43 within the interior portion 40 in response to a reciprocal movement of the piston 30 within the cylinder 28.

Further illustrated in FIG. 1 is the use of the primary power supply in the form of a motor 44, such motor having a pulley 46 fixedly, operably attached to its rotatable power shaft 48. A second pulley 50 is fixedly secured to a rotatable pump shaft 52 associated with the oil pump 34, and a drive belt 54 may be operably interconnected between the two pulleys 46, 50 so as to effect a transfer of power from the motor 44 to the oil pump 34. This transfer of power permits a selective operation of the oil pump 34 through an activation of the motor 44, thereby to selectively supply oil to the interior portion 40 of the cylinder 28.

With further reference to FIG. 1, it can be seen that the remaining free end of the piston rod 32 may be pivotally attached to a crankpin 56 which in turn is operably attached to a crank or wheel 58. The crank 58 is concentrically positioned about and fixedly secured to a power output shaft 60 forming a part of an energy pump 62. As desired, a power output may be taken off of the shaft 60, such as through the use of a pulley 64 fixedly secured thereto and having a drive belt 66 in operable engagement therewith. The drive belt 66 is similarly positionable over another pulley 68 which is fixedly attached to a pump shaft 70 forming a part of a second oil pump 72. Similarly, a second oil discharge line 74 and oil return line 76 are illustrated as being in fluid communication with an interior portion 78 of a second cylinder 80.

The construction of the present invention, as thus far described, has now been illustrated in its most basic form, and it can be appreciated with further reference to FIG. 1, that a second piston rod 82 associated with a second piston 85 may be interconnected to an even further crank 58 as impliedly existing beyond the separation lines 22, 24. In this regard, it can be seen that below the separation line 24, additional oil pumps, energy pumps, etc. may be employed to facilitate the desired design of the present invention. Alternatively, FIGS. 1 and 2 may be viewed as representing but a single oil pump 34 and energy pump 62, with the motor 44 serving as the source of rotative power for the energy pump or an even further power supply might be utilized to drive the pistons associated therewith. Accordingly, no additional description is deemed necessary with respect to the further illustrated components of the invention since they are identical in structure and manner of operation to those parts of the invention already described. By the same token, the entire schematic illustration of the present invention is to be viewed as representing either a plurality of individual components operating and being powered independently of one another or else single integral units having a plurality of pistons and the like contained therein and being powered by a single power source.

With particular reference to FIG. 3 of the drawings, a more detailed description of the structure and manner of operation of the present invention will be provided. In this regard, it can be seen that the cam 16, when rotated concurrently with the camshaft 12, serves to cause a reciprocable movement of the cam follower 84 within the cylinder 80. As shown, the cam follower 84 may include a topmost abutment member 86 and a bottommost member 88, such members being joined together by a cylindrically-shaped center support 90 which is slidably mounted within a guide 92 fixedly positioned within an interior portion of the cylinder 80. The topmost abutment member 86 and the bottommost member 88 are both of a circular plate-like construction and are of a diameter which substantially conforms to the inside diameter of the cylinder 80. By the same token, the guide 92 has a centrally positioned circular opening 94 through which the center support 90 of the cam follower 84 is positionable to facilitate a guiding operation during a reciprocal movement of the cam follower in a conventional manner.

FIG. 3 further illustrates the piston 84 in an upwardly extended position whereby the oil 43 contained within an interior portion 98 of the cylinder 80 is compressed, thus forcing the cam follower 84 upwardly through the guide 92 into abutment with the cam 16. In this respect, it can be seen that the reciprocable movement of the piston 85 within the cylinder 80 occurs as a result of the piston rod 82 reciprocably moving in response to a rotational movement of the crank or wheel 58 in a clockwise direction as indicated by the arrow 100.

Further illustrated in FIG. 3 is the fact that the oil discharge line 74 includes a one-way valve 102 located at an end portion thereof, such valve serving to permit an inflow of oil 43 into the interior portion 98 of the cylinder 80, while at the same time blocking any reverse flow of such oil during a pressurization thereof resulting from a return movement of the piston 85 upwardly through the cylinder 80. By the same token, it can be seen that the oil return line 76 designed to permit an outflow of oil from the interior space 98 when the same is uncovered by the piston 85. As such, the oil discharge line 74 always functions to direct oil 43 to the interior space 98, while the oil return line 76 always functions to return oil from the interior space 98 to the oil pump 72.

With respect to the construction of the oil pump 72, FIG. 3 illustrates the fact that the pump utilizes a piston and cylinder arrangement 106 to pump oil to and from the cylinder 80. In this connection, the piston and cylinder arrangement 106 includes a pump piston 108 reciprocally movable within a neck portion 110 of the pump 72, such piston being pivotally attached to a piston rod 112 by means of a piston pin 114. Additionally, the piston rod 112 is pivotally attached to a crankshaft 116 associated with the pump 72, such crankshaft having a crankpin 118 to which the piston rod is attached and further serving to effect the rotation of the pump shaft 70 in response to a rotatable movement of the crankshaft in the direction 119. As can be appreciated, an upward stroke of the piston 108 results in oil being moved through the oil discharge line 74 into the interior space 98 of cylinder 80, while a return stroke of the piston 108 results in oil being drawn out of the interior space 98 through return line 76 into the neck portion 110 of the pump 72.

To understand the operation of the present invention, a discussion thereof will be provided relative to the topmost portion of the drawing in FIG. 1, i.e., that portion of the invention above the separation line 22. In this respect, it is understood, as above discussed, that the additional components of the present invention, as illustrated below separation line 24 could also be included in the total construction thereof if desired. With particular reference to FIG. 1 then, it can be seen that a rotatable powering of the camshaft 12 by a timing chain results in the cams 14 and 16 effecting a reciprocable movement of their respective cam followers 26, 84.

Inasmuch as the interior portions 40, 98 of the respective cylinders 28, 80 are at all times maintained in a filled condition with oil 43 through a use of the respective oil pumps 34, 72, a compression of the oil contained within the interior spaces will be effected by the reciprocable movement of the respective pistons 30, 85.

Of course, the oil 43 is maintained in a pressurized condition within the interior spaces 40, 98 during a downward movement of the respective pistons 30, 85, since, as illustrated in FIG. 3, the respective pistons of the oil pumps 34, 72 will be on their upward strokes so as to direct oil through the respective discharge lines 36, 74 into the interior spaces.

As illustrated, the downward movement of piston 30 and its associated piston rod 32 is effected by the rotatable movement of the crank 58 fixedly secured to the energy pump 62. This, of course, results in the operation of the oil pump 72 through the pulleys 68, 64 and drive belt 66 associated therewith. As such, the energy pump serves as the source of power for effecting the drive of the oil pump 72. By the same token, the motor 44 is utilized to operate the oil pump 34 and the energy pump 62 if desired.

Along with the operation of the oil pump 72, it can be seen that the piston 85 is associated with a further piston rod 82 whereby this further piston rod may be reciprocated by an additional crank associated with even a further energy pump in lieu of being associated with the energy pump 62. In effect then, the power transfer apparatus of the present invention must be precisely timed to effect the proper operation thereof. In this connection, reference is made to FIG. 3 which illustrates the timing required to operate a portion of the invention. Specifically, it can be seen that when cam 16 forces the cam follower 84 downwardly through the guide aperture 94, the oil 43 contained within the interior space 98 will be pressurized, while the piston 85 is moving downwardly through the cylinder 80. At the same time, the piston 108 associated with the oil pump 72 will be on its upward stroke, so that when the piston 85 uncovers the one-way valve 102, pressurized oil 43 contained within the oil discharge line 74 may be ejected into the interior space 98 to maintain a volume of oil between the cam follower 84 and the piston 85.

Once the piston 85 reaches the bottom of its stroke, as indicated by broken lines 120 in FIG. 3, the piston 108 in the pump 72 will be on its downward stroke thus releasing the pressure on the oil 43 contained within the interior space 98. As the piston 85 moves back upwardly through the cylinder 80, the excess oil is carried along therewith and will flow outwardly into the return line 76 for redelivery to the pump 72. This, of course, fills the void within the neck portion 110 of the pump 72 that was created by the downward movement of the piston 108 within the neck portion per se. After the piston 85 moves past the return line 76, excess oil can be emitted from the interior portion 98 of the cylinder 80, and accordingly, the excess oil remaining therein is carried upwardly also, so as to force the cam follower 84 back upwardly through the guide aperture 94 and into abutment with cam 16. At the completion of this action, the follower body 88 has passed an overflow port (not illustrated but interconnected with return line 76) allowing the still upwardly moving piston 85 to discharge excess oil and top off at the peak of the stroke. Thus and at this time, cam 16 will force the cam follower 84 through the guide aperture 94, thus repeating the aforedescribed process.

As such, an improved power transfer apparatus has been described which combines the use of mechanical power transfer components and fluidic power transfer components to present an improved and more efficient device. By varying the volume of fluid within the respective interior portions of the cylinders through the selective locating of the oil discharge and return lines, as well as the pressure thereon, variable stroke and power transfer is obtained which could not otherwise be realized through the use of mechanical or fluidic devices independently of one another. Additionally, the construction of the present invention permits torque amplification through the inclusion of the fluidic power transfer system with the reciprocable piston and cylinder arrangement. Accordingly and with respect to the above description, it should be realized that the optimum dimensional relationships for the parts of the invention are deemed readily apparent and obvious to one who is skilled in the art to which the invention pertains, and all equivlent relationships to those illustrated in the drawings and described in the specification, to include modification of form, size, arrangement of parts and details of operation, are intended to be encompassed by the present invention.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A hydraulic power transfer apparatus comprising a power cylinder, a power piston mounted for reciprocation in the power cylinder, the power piston having a piston rod for connection to a power take off, an auxiliary piston mounted in a head end of the power cylinder in opposition to the power piston, the auxiliary piston having an exposed cam follower, a driven cam associated with the cam follower for moving the auxiliary piston in the power cylinder toward the power piston, a pump cylinder, a pump piston reciprocally mounted in the pump cylinder, drive means for providing reciprocation of the pump piston in the pump cylinder, a hydraulic fluid supply line extending from the pump cylinder to the power cylinder for supplying fluid under pressure from the pump cylinder to the power cylinder, said supply line communicating with an inlet port in the side of the power cylinder, and a delivery line extending from an outlet port in the side of the power cylinder to the pump cylinder for the return of hydraulic fluid from the power cylinder to the pump cylinder, wherein movements of the pump piston and cam are coordinated to provide reciprocation of the power piston in the power cylinder with the cam and auxiliary piston being effective to provide movement of the power piston away from the head end of the power cylinder until the power piston uncovers said inlet port, and the power piston on return strokes toward the head end of the power cylinder being effective to move the auxiliary piston and cam follower outwardly toward the cam whereby the follower reengages the cam after the power piston covers said outlet port.

2. The invention of claim 1 wherein the apparatus is replicated, the drive means for one of the pump pistons being operated by an external source of power and one of the power cylinders having a power take off operably connected with the other pump piston to provide the drive means for the other pump piston.

3. The invention of claim 2 including a unitary drive for the cams of the respective auxiliary pistons.

4. The invention of claim 2 wherein the power take off from said one of the cylinders is connected with the other pump piston by a crank, pulley wheel, and belt drive.

5. The invention of claim 1 wherein the apparatus is replicated in plural series with the drive means for a first of the pump pistons being operated by an external power source, a power take off from a first of the power pistons forming the drive means for a second of the pump pistons, and a power take off from a second of the power pistons forming the drive means for a third of the pump pistons.

6. The invention of claim 5 including a unitary drive for the cams of the respective auxiliary pistons.

7. The invention of claim 5 wherein the power take offs from the respective power pistons are connected with the respective pump pistons by crank, pulley, and belt drives.

8. The invention of claim 1 wherein the power take off comprises a crank having a center of rotation which is laterally offset from the center line of the power cylinder.

* * * * *